United States Patent [19]

Momose et al.

[11] Patent Number: 4,605,685

[45] Date of Patent: Aug. 12, 1986

[54] METHOD FOR PREPARATION OF GRAFT POLYMERIC MEMBRANES

[75] Inventors: Takashi Momose, Urbana, Ill.; Kazuo Tomiie, Tokyo, Japan; Hiroyuki Harada, Yokohama, Japan; Hiroshi Miyachi, Okayama, Japan; Hiroko Kato, Tamano, Japan

[73] Assignee: Chlorine Engineers Corp., Ltd., Tokyo, Japan

[21] Appl. No.: 648,018

[22] Filed: Sep. 6, 1984

[30] Foreign Application Priority Data

Sep. 6, 1983 [JP] Japan ................................ 58-162512
Nov. 22, 1983 [JP] Japan ................................ 58-218679
Dec. 13, 1983 [JP] Japan ................................ 58-233680
Mar. 19, 1984 [JP] Japan ................................ 59-51096

[51] Int. Cl.$^4$ ........................ C25B 13/00; C29C 7/04
[52] U.S. Cl. ................................ 522/124; 525/276; 525/326.2; 525/340; 525/343; 525/379; 525/386; 204/296
[58] Field of Search ............ 204/296, 159.15, 159.17; 525/276, 326.2, 340, 343, 379, 386; 522/124

[56] References Cited

U.S. PATENT DOCUMENTS

| | | | |
|---|---|---|---|
| 4,012,303 | 3/1977 | D'Agostino | 204/296 |
| 4,166,014 | 8/1979 | Sata | 204/296 |
| 4,506,035 | 3/1985 | Barnett | 525/276 |

*Primary Examiner*—John F. Niebling
*Attorney, Agent, or Firm*—Kuhn Muller and Bazerman

[57] ABSTRACT

A method for the preparation of a graft polymer membrane comprising an inactive polymer film having TFS as a graft chain. The inactive polymer film is irradiated with ionizing radiation, and the resulting irradiated film is graft-polymerized by contacting said film with TFS.

This product may then be sulfonated to provide a cation exchange membrane; or the obtained graft polymer may be haloalkylated, and quarternary aminated to provide an anion exchange membrane; or the graft polymer membrane may be used to prepare a weakly acidic cation exchange membrane by substituting at least part of the benzene rings of the graft polymer by one of the groups among hydroxyl groups, carboxylic acid groups, phosphoric acid groups and phosphorous acid groups.

The polymeric membrane products are also disclosed and claimed.

13 Claims, 5 Drawing Figures

METHOD FOR PREPARATION OF GRAFT POLYMERIC MEMBRANES

BACKGROUND OF INVENTION

This invention relates generally to electrolytic apparatus, and more specifically relates to polymeric membranes of the type used in electrochemical cells, and to methods for manufacture of such membranes.

A cation exchange membrane comprising an inactive polymer film having sulfonated $\alpha,\beta,\beta$-trifluorostyrene (hereinafter $\alpha,\beta\beta$-trifluorostyrene shall be referred as "TFS") as a graft chain is disclosed in U.S. Pat. No. 4,012,303, and has been used for the electrolysis of sodium chloride and fuel cells. The cation exchange membrane therein is prepared by graft-polymerizing TFS onto the inactive polymer film, and then sulfonating the grafted film.

Heretofore, the graft polymer membrane comprising the inactive polymer film and TFS graft-polymerized thereon has been prepared by dipping an inactive polymer film in or otherwise contacting it with a solution of TFS in an inert organic solvent, irradiating the film with Co or the like to graft-polymerize the TFS, and then sulfonating the grafted film. However, this method suffers from certain deficiencies, including that it is low in productivity and uneconomical, because the irradiation must be continued for 240 hours in order to produce a cation exchange membrane having a graft rate of about 15%. Furthermore since the TFS is also simultaneously irradiated, homopolymerization of the TFS, decrease of the graft rate and deterioration of the TFS occurs.

SUMMARY OF INVENTION

Now in accordance with the present invention a method is provided for economically producing the membrane in a short irradiation time and with no homopolymerization or deterioration occurring on the TFS. The membrane can be produced with high efficiency by irradiating the inactive polymer film alone with ionizing radiation to form radicals, and dipping or otherwise contacting said radical-containing film with TFS or its solution to graft-polymerize the membrane. Subsequently the membrane may be sulfonated, or in accordance with a further aspect of the invention, may be quaternary-aminoalkylated to provide an anion exchange membrane; or the membrane may be treated as to substitute at least part of the benzene rings of the graft polymer by hydroxyl groups, carboxylic acid groups, phosphoric acid groups, and/or phosphorous acid groups.

Thus, this invention provides a method for the preparation of a graft polymer membrane comprising an inactive polymer film having TFS as a graft chain by irradiating the inactive polymer film alone with ionizing radiation, and graft-polymerizing the irradiated film by dipping in or otherwise contacting same with TFS or its solution.

The inactive polymer film used in the invention may be any film comprising a hydrocarbon polymer, fluorine-containing hydrocarbon polymer, perfluorohydrocarbon polymer or the like, which may be either a homopolymer or a copolymer, and it is selected, for example, from polyethylene-polytetrafluoroethylene copolymer film, polychlorotrifluoroethylene film, polyvinylidene fluoride film, polyvinyl fluoride film, tetrafluoroethylene-hexafluoropropylene copolymer film, tetrafluoroethylene-ethylene copolymer film, tetrafluoroethyleneperfluoroalkyl vinyl ether copolymer film and chlorotrifluoroethylene-ethylene copolymer film. These films may have fine pores.

The radiation applied to the inactive polymer film alone may be any one capable of forming radicals on the film, and various ionizing radiations can be used for this purpose. The dose of the radiation should be 1 to 30 Mrad, which varies with the material of the inactive polymer film. A dose of less than 1 Mrad or more than 30 Mrad is undesirable, because the graft polymerization does not proceed well in the former case or the membrane function is lowered in the latter. The irradiation can be carried out in the air, in an oxygen atmosphere, or in a nitrogen atmosphere. The radicals formed on the irradiated film will retain their life for about two weeks at 0° C., for about a week at 10° C., and for two to three days at room temperature, in an inert gaseous atmosphere. Accordingly, this enables the irradiated film to be transported to another locale to facilitate a graft polymerization as will be described later.

Subsequently, the graft polymerization of TFS is carried out on the irradiated film as follows: The irradiated film is dipped in TFS which has or has not been dissolved in a solvent, such as chloroform, methylene chloride, carbon tetrachloride, 1,1,2,2-tetrachloroethane, 1,1,2-trichlorotrifluoroethane or benzene, or the film is contacted with TFS by coating or other means, and the reaction is carried out at 10° to 90° C. for 1 to 50 hours. In this case, the reaction does not require any additives such as a catalyst, but it proceeds simply by dipping the film in or contacting it with TFS to give a graft polmer membrane at a graft rate of 10 to 50%.

$$\text{Graft rate (\%)} = \frac{\text{Weight of graft polymer membrane} - \text{Weight of base film}}{\text{Weight of base film}} \times 100$$

The graft polymer membrane can be used as a cation exchange membrane by substituting benzene rings by sulfonic acid, carboxylic acid, phosphoric or phosphorous acid groups; as an anion exchange membrane by substituting benzene rings by amino groups; and as a neutral membrane by substituting benzene rings by hydroxyl groups. Subsequently, the substitution of the benzene rings of the graft polymer membrane produced as above will be explained.

DESCRIPTION OF PREFERRED EMBODIMENTS

Production of Sulfonated Graft Polymer Membranes

Figure 1:
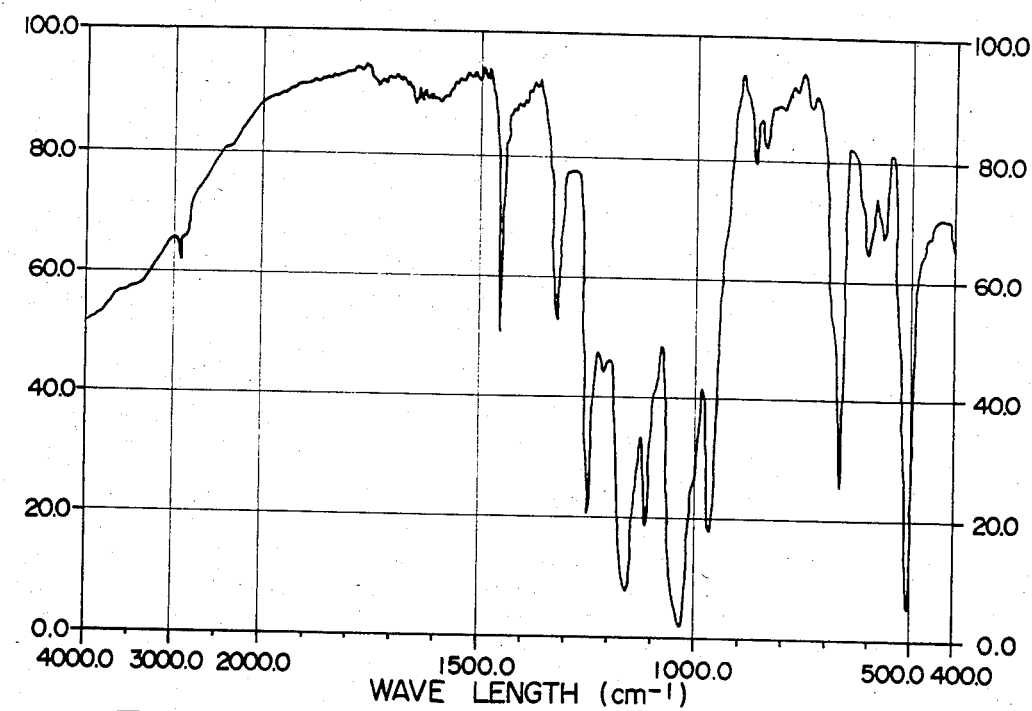
FIG. 1 is a surface infrared spectrum of tetrafluoroethylene-ethylene copolymer film before the graft polymerization of TFS.

The sulfonating agents usable in producing sulfonated graft polymer membranes in accordance with the invention, include chlorosulfonic acid, fluorosulfonic acid, concentrated sulfuric acid and sulfuric anhydride. It is prefered to use chlorosulfonic or fluorosulfonic acid rather than concentrated sulfuric acid which affords a low rate of sulfonation, or sulfuric anhydride which is difficult to handle. The graft polymer membrane is dipped in a solution of a sulfonating agent in carbon tetrachloride, chloroform or methylene chloride and is reacted at 40° to 150° C. for 10 to 100 minutes. The graft polymer membrane is then treated in an aqueous solution of 1N-KOH at 90° C. for one or two hours for conversion into a sulfonate salt. The product thus obtained is a sulfonated membrane having a sulfonation rate of 40 to 100% and a membrane resistance of 0.9 to 5 ohm.cm.

Practice of the invention in preparing cation membranes of the sulfonated graft polymer type is illustrated by the following example, which are to be deemed illustrive not definitive of the invention:

EXAMPLE I

A cation exchange membrane prepared as above (wherein the inactive polymer film used as a sample was a tetrafluorethylene-ethylene copolymer film) was compared as respects physical properties with Nafion ® 120 which is a product of Du Pont, and a perfluorocarbon-sulfonate type cation exchange membrane. The results are shown in Table 1.

TABLE 1

| Membrane | (a) Ion exchange capacity | (b) Membrane resistance | Extensibility | (c) Transference number |
|---|---|---|---|---|
| Membrane of this invention | 0.61 | 1.71 | 3.4 to about 4.5 | 0.94 |
| Nafion 120 | 0.83 | 1.48 | 4.0 | 0.93 |

(a) meq/g of dry membrane
(b) ohm · m in 0.5 N KCl
(c) 0.5 N/1.0 N KCl

Table 1 indicates that the above cation exchange membrane where the inactive polymer film comprises a fluorine-containing polymer, has nearly the same properties as Nafion ® 120, a product of Du Pont, which is a membrane consisting of a perfluorocarbon polymer.

The cation exchange membrane can be used as diaphrams for various purposes, such as the electrolysis of water, the electrolysis of sodium chloride, the electrolysis of Glauber's salt, fuel cells, the electrolysis of sodium salts of amino acids, high-temperature electrodialysis or in zinc-halogen type cells, as will be illustrated below.

In this invention, an inactive polymer film is first irradiated with ionizing radiation to form radicals on the film, the irradiated polymer film is subsequently dipped in or otherwise contacted with TFS to cause a graft polymerization, so that the TFS is free from the irradiation and never polymerized nor deteriorated. Moreover, since the graft polymerization of TFS on the inactive polymer film is carried out without any irradiation, the irradiation time can be shortened, and the dose can be decreased. Accordingly, the method of this invention is quite economical and safe.

EXAMPLE II

A 100 micron-thick low-density polyethylene film was irradiated in a dose of 10 Mrad under conditions of 2 MV and 1 mA in a nitrogen atmosphere, using a resonant transfer electrobeam generator. Then, the irradiated polyethylene film was placed in a reaction vessel and deaerated under a reduced pressure of $10^{-3}$ mmHg, and TFS which had previously been freed of dissolved oxygen by freeze-deaeration was injected into the reaction vessel, to carry out a reaction in a state in which the irradiated film was kept in the TFS at room temperature for 20 hours. On completion of the reaction, the resulting graft polymer film was taken out of the vessel, cleaned with n-hexane, and then dried. The graft polymer membrane thus obtained had a graft rate of 23%.

The graft polymer membrane was sulfonated by dipping in a solution consisting of 30 parts of chlorosulfonic acid and 70 parts of carbon tetrachloride at 40° C. for 40 minutes. On completion of the reaction, the membrane was taken out of the vessel and cleaned with carbon tetrachloride to remove excessive chlorosulfonic acid. The graft polymer membrane thus sulfonated had a sulfonation rate of 95%.

The membrane was subsequently hydrolyzed by dipping in a 1N KOH solution at 90° for two hours. The resulting graft polymer membrane had an ion exchange capacity of 1.5 meq/g of dry membrane.

This graft polymer membrane had an electric resistance of 1.4 ohms.cm$^2$ when measured under 1 KHz AC in 0.6N KCl at 20° C., and a transference number of 0.90 when measured in 0.5N KCl/1.0N KCl. When the same membrane was dipped in an aqueous solution of 3% $H_2O_2$ containing 4 ppm of Mohr's salt at 70° C. for 24 hours, the film had its weight decreased by 15%.

EXAMPLE III

A graft polymer membrane was prepared as in Example II, except that a 100 micron thick polyvinylidene fluoride film was used. The membrane obtained had a graft rate of 20%, a sulfonation rate of 60%, and an ion exchange capacity of 0.6 meq/g of dry membrane.

This graft polymer membrane had an electric resistance of 3.2 ohms.cm$^2$ when measured under 1 KHz AC in 0.6N KCl at 20° C., and a transference number of 0.93 when measured in 0.5N KCl/1.0N KCl. When the graft polymer membrane was dipped in an aqueous solution of 3% $H_2O_2$ containing 4 ppm of Mohr's salt at 70° C. for 24 hours, the membrane had its weight decreased by 10%.

EXAMPLE IV

A 100 micron tetrafluoroethylene-ethylene copolymer film was irradiated with a dose of 10 Mrad in the same manner as in Example II. Subsequently, the irradiated film was placed in a reaction vessel and deaerated under a reduced pressure of $10^{-3}$ mm Hg, and a TFS solution (50 parts of TFS and 50 parts of 1,2,2-trichlorotrifluoroethane) which had previously been freed of dissolved oxygen by freeze-deaeration was injected into the vessel, to cause a graft polymerization in a state in which the irradiated film was kept dipped in the TFS at 50° C. for 20 hours. On completion of the reaction, the resulting graft polymer film was taken out of the vessel, cleaned with n-hexane, freed of unchanged monomers by extraction, and then dried. The graft polymer membrane thus obtained had a graft rate of 21%.

Figure 2:
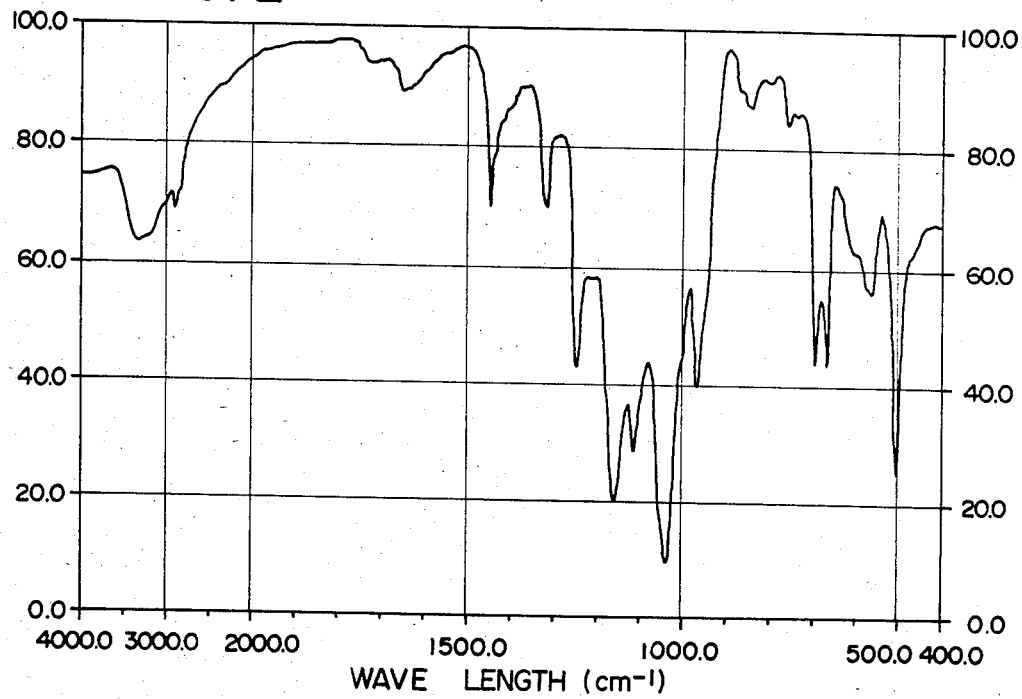
FIG. 2 is a surface infrared spectrum of the graft polymer film comprised of the film and TFS graft-polymerized thereon in accordance with the invention.

FIG. 1 is a surface infrared spectrum of tetrafluoroethylene-ethylene copolymer film before the graft polymerization of TFS, and FIG. 2 is a surface infrared spectrum of the graft polymer film comprised of the film and TFS graft-polymerized thereon.

In FIG. 2, the absorptions at 1720 and 1640 cm$^{-1}$ indicate the double bonds of the benzene rings and the absorption at 690 cm$^{-1}$ indicates one-substituted benzene rings. From the two spectra, the graft-polymerization of TFS onto the tetrafluoroethylene-ethlene copolymer was confirmed.

This graft polymer membrane was sulfonated by dipping in a solution consisting of 30 parts of chlorosulfonic acid and 70 parts of 1,1,2,2-tetrachloroethane at 135° C. for 40 minutes. On completion of the reaction, the graft polymer membrane was taken out of the vessel and cleaned with carbon tetrachloride to remove excessive chlorosulfonic acid. The membrane thus obtained had a sulfonation rate of 90%.

This graft polymer membrane was hydrolyzed by dipping in a 1N KOH solution at 90° C. for two hours. The resulting membrane had an ion exchange capacity of 1.0 meq/g of dry membrane.

This graft polymer membrane had an electric resistance of 2.1 ohm.cm$^2$ when measured under 1 KHz AC in 0.6N KCl at 20° C., and a transference number of 0.92 when measured in 0.5N KCl/1.0N KCl. This film had its weight decreased by 3% when it was dipped in an aqueous solution of 3% $H_2O_2$ containing 4 ppm of Mohr's salt at 70° C. for 24 hours.

EXAMPLE V

A 100 micron-thick tetrafluoroethylene-ethylene copolymer film was graft-polymerized and subsequently sulfonated in the same manner as in Example IV, to give a graft polymer membrane. The graft polymer membrane thus obtained had a graft rate of 16%, a sulfonation rate of 80%, and an ion exchange capacity of 0.7 meq/g of dry membrane.

This graft polymer membrane had an electric resistance of 3.5 ohm.cm$^2$ when measured under 1 KHz AC in 0.6N KCl at 20° C., and a transference number of 0.93 when measured in 0.5N KCl/1.0N KCl. This membrane had its weight decreased by 3% when it wad dipped in an aqueous solution of 3% $H_2O_2$ containing 4 ppm of Mohr's salt at 70° C. for 24 hours.

Figure 3:
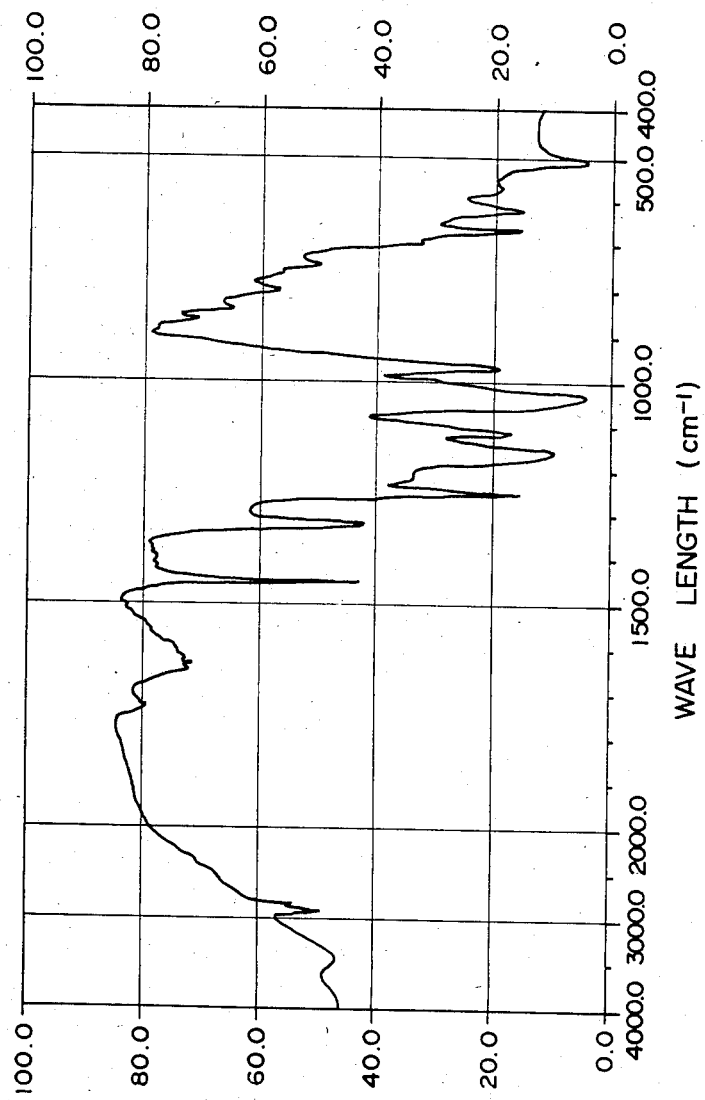
FIG. 3 is an infrared spectrum of the resulting membrane of a sulfonated graft polymer membrane in accordance with the invention; produced in accordance with Example V herein.

An infrared spectrum of this membrane appears in FIG. 3.

EXAMPLE VI

A 100 micron thick polytetrafluoroethylene film was graft-polymerized and subsequently sulfonated in the same manner as in Example IV to give a graft polymer membrane.

This graft polymer membrane had an electric resistance of 4.0 ohm.cm$^2$ when measured under 1 KHz AC in 0.6N KCl at 20° C., and a transference number of 0.93 when measured in 0.5N KCl/1.0N KCl. This membrane had its weight decreased by less than 1% when it was kept in an aqueous solution of 3% $H_2O_2$ containing 4 ppm of Mohr's salt at 70° C. for 24 hours.

EXAMPLE VII

The graft polymer membrane produced according to the method of Example V was coated on both sides with a powdery mixture consisting of ruthenium black and graphite in a ratio of 1:1 by weight, using polytetrafluorethlene as a binder under a pressure of 126 kg/cm$^2$ at 350° C. for 30 minutes. Separately, graphite and a polytetrafluoroethlene emulsion were mixed in a ratio of 8:2 by weight, and the mixture was hot-pressed under 130 kg/cm$^2$ at 350° C. for 30 minutes to give a porous membrane having a thickness of 100 microns. This porous membrane was affixed onto the catalyst layer side of the graft polymer membrane by means of a hot press under 130 kg/cm$^2$ at 350° C. for 30 minutes, whereby a fuel cell having this porous membrane on the oxygen pole side was prepared.

EXAMPLE VIII

A saturated sodium chloride solution was electrolyzed in an electrolyzer having an effective current-flow area of 1 dm$^2$ by the use of the graft polymer membrane produced according to the method of Example V. The anode was made of titanium mesh coated with $TiO_2$ and $RuO_2$, and the cathode made of stainless steel mesh. The saturated sodium chloride solution, charged in the anode chamber, was electrolyzed at a current density of 30 A/dm$^2$ to give 30% NaOH, where the current efficiency was 92% and the cell voltage was 3.3 V.

EXAMPLE IX

The electrolyzer used herein was a three-chamber structure having an anode chamber, a central partition chamber and a cathode chamber partitioned by two sheets of the graft polymer membrane produced according to the method of Example V. The anode was made of titanium mesh coated with $TiO_2$ and $RuO_2$, and the cathode nickel mesh. The anode chamber was charged with 10% $H_2SO_4$, the central partition chamber with 15% $Na_2SO_4$, and the cathode chamber with 10% NaOH. As a result of electrolysis at a current density of 20 A/dm$^2$, a 4% $H_2SO_4$ solution was obtained from the central partition chamber, and a 15% NaOH solution from the cathode chamber, where the current efficiency was 70% and the cell voltage 4.2 V.

Production of Anion Exchange Membranes

Anion exchange membranes can be produced with high efficiency by irradiating the inactive polymer film alone with ionizing radiation to form radicals, dipping said radical-containing film in or otherwise contacting it with TFS or its solution to graft-polymerize the membrance, and subsequently haloalkylating and quarternary-aminating it.

The present invention, in a further aspect thereafter, provides an anion exchange membrane comprising a graft polymer membrane composed of an inactive polymer film and TFS thereon as a graft chain, wherein at least part of benzene rings is substituted by quarternary ammonium alkyl group; and provides a method for the preparation of such an anion exchange membrane.

As indicated, following the graft polymerization of TFS, the graft polymer membrane is haloalkylated; as haloalkyl group, chloromethyl group, bromomethyl group, chloroethyl group and the like can be used. As a haloalkylating agent, which depends on the kind of the haloalkyl group, chloromethylether ($CH_3OCH_2Cl$), paraformaldehyde (($CH_2O)_3$) and hydrochloric acid and the like can be employed in the case of the chloromethyl group. A known process may be employed to introduce the haloalkyl group. When chloromethylether is used as a haloalkylating agent, the graft polymer membrane is dipped in chloromethylether containing alminum chloride as a catalyst to react for 1–20 hours at 40°–80° C. When paraformaldehyde is used, the graft polymer membrane is allowed to react with paraformaldehyde and hydrochloric acid in the presence of zinc chloride as a catalyst at 40°–80° C. The chloromethylation rate upon completion of the reaction is 10 to 100%.

Subsequently, after the graft polymer membrane is dipped in benzene and the like to be swelled somewhat, it is dipped in 5–50% tertiary amine aqueous solution at 40°–70° C. for 2–10 hours to produce an anion exchange membrane. As tertiary amine, trimethylamine, triethylamine, N,N-dimethyl-2-hydroxyethylamine and the like can be employed. The ion exchange capacity of the anion exchange membrane is 0.6–2.0 meq/g. dry resin.

Practice of the invention as same relates to production of anion exchange members will now be illusrated by the following Examples, which are again deemed to be illustrative and not delimitive of the invention.

EXAMPLE X

A 100-micron thick low-density polyethylene film was irradiated in a dose of 10 Mrad under conditions of 2 MV and 1 mA in a nitrogen atmosphere, using a resonant transfer electrobeam generator. Then, the irradiated polyethylene film was placed in a reaction vessel and deaerated under a reduced pressure of $10^{-3}$ mmHg, and TFS which had previously been freed of dissolved oxygen by freeze-deaeration was injected into the reaction vessel, to carry out a reaction in a state in which the irradiated film was kept in the TFS at room temperature for 20 hours. On completion of the reaction, the resulting graft polymer film was taken out of the vessel, cleaned with n-hexane, and then dried. The graft polymer membrane thus obtained had a graft rate of 23%.

The graft polymer membrane was dipped in chloromethylether containing aluminum chloride as catalyst to be reacted at 58° C. for 6 hours, was washed with 10% hydrochloric acid, and then was washed with distilled water. The chloromethylation rate of the thus obtained graft polymer membrane was 80%.

The graft polymer membrance, after the chloromethylation, was dipped in benzene for 30 minutes to be swollen, was dipped in 30% trimethylamine aqueous solution to be reacted for 4 hours at 50° C.

The ion exchange capacity of the anion exchange membrane thus obtained was 0.86/meq/g. dry resin.

This anion exchange polymer membrane had an electric resistance of 4.2 ohm.cm$^2$ when measured under 1 KHz AC in 0.6N KCl at 20° C., and a transference number of 0.92 when measured in 0.5N KCl/1.0N KCl. When the anion exchange membrane was dipped in distilled water at 95° C. for 6 hours, the weight decrease rate was nearly 0% and the membrane resistance and the transference number were scarcely unchanged.

EXAMPLE XI

A graft polymer membrane was prepared as in Example X, except that a 100-micron thick polyvinylidene fluoride film was used. The membrane obtained had a graft rate of 20%, a chloromethylation rate of 78%, and an ion exchange capacity of 0.75 meq/g of dry membrane.

This anion exchange membrane had an electric resistance of 5.0 ohm.cm$^2$ when measured under 1 KHz AC in 0.6N KCl at 20° C., and a transference number of 0.93 when measured in 0.5N KCl/1.0N KCl. When the anion exchange membrane was dipped in distilled water at 95° C. for 6 days, the weight decrease rate of the membrane was nearly 0% and the membrane resistance and the transference number were scarcely unchanged.

EXAMPLE XII

A 100 micron-thick tetrafluoroethylene-ethylene copolymer film was irradiated in a dose of 10 Mrad in the same manner as in Example X. Subsequently, the irradiated film was placed in a reaction vessel and deaerated under a reduced pressure of $10^{-3}$ mmHg, and a TFS solution (50 parts of TFS and 50 parts of 1,2,2-trichlorotrifluoroethane) which had previously been freed of dissolved oxygen by freeze-deaeration was injected into the vessel, to cause a graft polymerization in a state in which the irradiated film was kept dipped in the TFS at 50° C. for 6 hours. On completion of the reaction, the resulting graft polymer film was taken out of the vessel, cleaned with n-hexane, freed of unchanged monomers by extraction, and then dried. The graft polymer membrane thus obtained had a graft rate of 18%.

The graft polymer membrane was dipped in chloromethylether containing alminum chloride as catalyst to be reacted at 58° C. for 6 hours, was washed with 10% hydrochloric acid, and then was washed with distilled water. The chloromethylation rate of the thus obtained graft polymer membrane was 80%.

Figure 4:
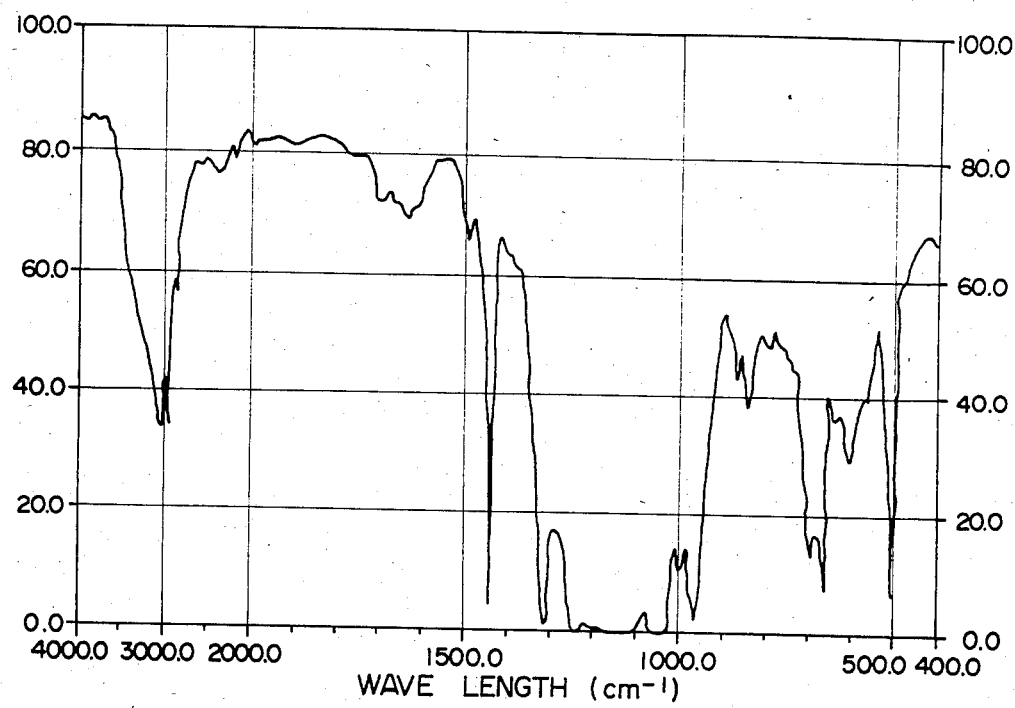
FIG. 4 is an infrared spectrum of the graft polymer membrane after chloromethylation in accordance with Example XII.

FIG. 4 is an infrared spectrum of the graft polymer membrane after chloromethylation. The chloromethylation was confirmed to occur by the absorption at 790 cm$^{-1}$ due to the stretching vibration of C-Cl bond.

After the graft polymer membrane from the chloromethylation was dipped in benzene for 30 minutes to be swollen, it was dipped in 30% trimethylamine aqueous solution and reacted for 4 hours at 50° C.

Figure 5:
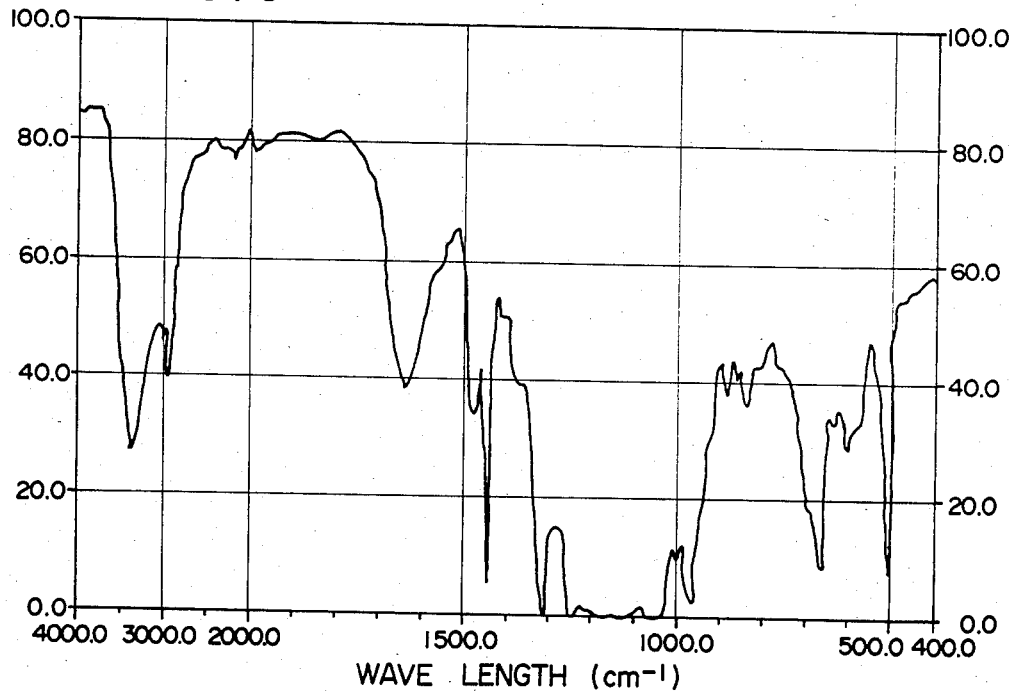
FIG. 5 is an infrared spectrum of the anion exchange membrane after quaternary amination of the product of Example XII herein.

FIG. 5 is an infrared spectrum of the graft polymer membrane (anion exchange membrane) after amination. The amination was confirmed to occur by the absorption at 1480 cm$^{-1}$ due to the stretching vibration of active methylene group. The absorptions at 3600 cm$^{-1}$ and 1640 cm$^{-1}$ due to water in the anion exchange membrane were observed.

The ion exchange capacity of the thus obtained anion exchange membrane was 0.7 meq/g. dry resin.

This anion exchange membrane had an electric resistance of 4.8 ohm.cm$^2$ when measured under 1 KHz AC in 0.6N KCl at 20° C., and a transference number of 0.94 when measured in 0.5N KCl/1.0N KCl. When the anion exchange membrane was dipped in distilled water at 95° C. for 6 days, the weight decrease rate of the membrane was nearly 0% and the membrane resistance and the transference number were scarcely unchanged.

EXAMPLE XIII

A 25 micron-thick tetrafluoroethylene-ethylene copolymer film was graft-polymerized and subsequently chloromethylated in the same manner as in Example XII to give a graft polymer membrane. The graft polymer membrane thus obtained had a graft rate of 18%, and a chloromethylation rate of 80%.

The graft polymer membrane after chloromethylation was dipped in N,N-dimethyl-2-hydroxylethylamine and reacted at 50° C. for 6 hours.

The ion exchange capacity of the anion exchange membrane was 0.7 meq/g. dry resin and an ion exchange capacity of 0.7 meq/g of dry membrane.

This anion exchange membrane had an electric resistance of 5.2 ohm.cm$^2$ when measured under 1 KHz AC in 0.6N KCl at 20° C., and a transference number of 0.95 when measured in 0.5N KCl/1.0N KCl. When the anion exchange membrane was dipped in distilled water at 95° C. for 6 days, the weight decrease rate of the membrane was nearly 0% and the membrane resistance and the transference number were scarcely unchanged.

EXAMPLE XIV

An anion exchange membrane was prepared as in Example XII, except that a 100 micron-thick tetrafluoroethylene film was used. The anion exchange membrane thus obtained had a graft rate of 18%, a chloromethylation rate of 80%, and an ion exchange capacity of 0.71 meq/g of dry membrane.

This anion exchange membrane had an electric resistance of 6.0 ohm $cm^2$ when measured under 1 KHz AC in 0.6N KCl at 20° C., and a transference number of 0.93 when measured in 0.5N KCl/1.0N KCl. When the anion exchange membrane was dipped in distilled water at 95° C. for 6 hours, the weight decrease rate of the membrane was nearly 0% and the membrane resistance and the transference number were unchanged.

EXAMPLE XV

As a comparison, an anion exchange membrane was prepared which comprised a commercial divinylbenzene-vinylidenchloride copolymer film treated with trimethylamine, was dipped in distilled water at 95° C. for 6 hours, the weight decrease rate was 10%. The membrane resistance (in 0.6N KCl) before the heat treatment was 21.6 ohm $cm^2$, and after the heat treatment was 21.2 ohm $cm^2$, the difference was scarcely unfound. However, the transference number (in 0.5N KCl/1.0N KCl) was decreased from 0.94 before the heat treatment to 0.92 after the heat treatment.

Production of Cation Exchange Membranes

Weakly acidic cation exchange membranes can be produced with high efficiency by irradiating the inactive polymer film alone with ionizing radiation to form radicals, dipping said radical-containing film in or otherwise contacting it with TFS or its solution to graft-polymerize the membrane, and subsequently hydroxylating, carboxylating, phosphorating or phosphonating it.

Thus, this invention in a further aspect thereof provides a weakly acidic cation exchange membrane comprising a graft polymer membrane composed of an inactive polymer film and TFS thereon as a graft chain, wherein at least part of benzene rings is substituted by one of groups among hydroxyl group, carboxylic acid group, phosphoric acid group and phosphorous acid group; and provides a method for the preparation of such a weakly acidic cation exchange membrane.

Following the graft polymerization of TFS as previously discussed, the hydroxylation, carboxylation, phosphoration or phosphonation of the membrane is carried out. The introduction of the substituting groups may be carried out by known methods.

When hydrogen peroxide is employed as a hydroxylating reagent, the graft-polymer membrane is dipped in a 3%-aqueous hydrogen peroxide solution containing aluminum chloride as a catalyst to be reacted at 0°-5° C. for 1-10 hours. When alkylhydroperoxide is employed, the graft-polymer membrane is dipped in an alkylhydroperoxide solution containing alminum chloride as a catalyst to be reacted at −20° to 0° C. for 1-10 hours. Upon completion of the reaction, the hydroxylation rate is 10-100%. The ion exchange capacity of the thus manufactured weakly acidic membrane is 0.6-20 meq/g dry resin.

Oxalic chloride, alkyllithium-carbon dioxide and the like can be used as a carboxylating reagent. The carboxylation rate is 40-90%.

Trialkyl phosphate, dialkyl phosphite and the like can be used as a phosphoration or phosphonation reagent. The phosphoration or phosphonation rate is 50-95%.

The hydroxylation according to the present invention means that the hydroxyl group is in combination with the benzene ring directly. However, the carboxylation, phosphoration and phosphonation include the direct combination with the benzene ring and the indirect combination with the benzene ring through methylene groups.

The weakly acidic cation membrane according to the present invention can be used as various diaphragms for such purposes as the electrolysis of Glauber's salt, the electrolysis of water, desalination of sea water, electrodialysis and the like.

Practice of the invention in the course of preparation weakly acidic cation exchange members will now be illustrated by the following Examples. However, the invention shall not be limited to these Examples:

EXAMPLE XVI

A 100 micron-thick low-density polyethylene film was irradiated with a dose of 10 Mrad under conditions of 2 MV and 1 mA in a nitrogen atmosphere, using a resonant transfer electrobeam generator. Then, the irradiated polyethylene film was placed in a reaction vessel and deaerated under a reduced pressure of $10^{-3}$ mmHg, and TFS which had previously been freed of dissolved oxygen by freeze-deaeration was injected into the reaction vessel, to carry out a reaction in a state in which the irradiated film was kept in the TFS at room temperature for 20 hours. On completion of the reaction, the resulting graft polymer film was taken out of the vessel, cleaned with n-hexane, and then dried. The graft polymer membrane thus obtained has a graft rate of 23%.

The graft polymer membrane was dipped in a 3%-hydrogen peroxide aqueous solution containing alminum chloride as catalyst to be reacted at 0°-5° C. for 2 hours, and then was washed with 1N-hydrochloric acid. The hydroxylation rate of the thus obtained weakly acidic cation exchange membrane was 90%, and the ion exchange capacity was 0.97 meq/g. dry resin. The weakly acidic cation exchange membrane was dipped in 0.5N-KOH aquous solution. This weakly acidic cation exchange membrane had an electric resistance of 6.0 ohm $cm^2$ when measured under 1 KHz AC in 0.6N KCl at 20° C., and a transference number of 0.96 when measured in 0.5N KCl/1.0N KCl. When the exchange membrane was dipped in distilled water at 95° C. for 6 hours, the weight decrease rate was nearly 0% and the membrane resistance and the transference number were scarcely unchanged.

EXAMPLE XVII

A weakly acidic cation membrane was prepared as in Example XVI, except that a 100 micron-thick polyvinylidene fluoride film was used. The membrane obtained herein had a graft rate of 20%, a hydroxylation rate of 85%, and an ion exchange capacity of 0.82 meq/g of dry membrane.

This membrane had an electric resistance of 7.2 ohm.$cm^2$ when measured under 1 KHz AC in 0.6N KCl at 20° C., and a transference number of 0.97 when measured in 0.5N KCl/1.0N KCl after the conversion of phenolic hydroxyl group to K-form by the treatment of 0.5N-KOH aqueous solution. When the cation exchange membrane was dipped in distilled water at 95° C. for 6 days, the weight decrease rate of the membrane was nearly 0% and the membrane resistance and the transference number were was scarcely changed.

EXAMPLE XVIII

A 25 micron-thick tetrafluoroethylene-ethylene copolymer film was irradiated in a dose of 10 Mrad in the same manner as in Example XVI. Subsequently, the irradiated film was placed in a reaction vessel and deaerated under a reduced pressure of $10^{-3}$ mmHg, and a TFS solution (50 parts of TFS and 50 parts of 1,2,2-trichlorotrifluoroethane) which had previously been freed of dissolved oxygen by freeze-deaeration was injected into the vessel, to cause a graft polymerization in a state in which the irradiated film was kept dipped in the TFS at 50° C. for 6 hours. On completion of the reaction, the resulting graft polymer film was taken out of the vessel, cleaned with n-hexane, freed of unchanged monomers by extraction, and then dried. The graft polymer membrane thus obtained had a graft rate of 18%. The graft polymer membrane was dipped in a 3%-hydrogen peroxide aqueous solution containing alminum chloride as catalyst to be reacted at 0°–50° C. for 2 hours, and then were washed with 1N-hydrochloric acid. The hydroxylation rate of the thus obtained membrane was 90%, and the ion exchange capacity was 0.79 meq/g. dry resin.

This weakly acidic cation exchange membrane had an electric resistance of 2.5 ohm.cm$^2$ when measured under 1 KHz AC in 0.6N KCl at 20° C., and a transference number of 0.97 when measured in 0.5N KCl/1.0N KCl after the conversion of phenolic hydroxyl group to K-form by the treatment of 0.5N-KOH aqueous solution. When the cation exchange membrane was dipped in distilled water at 95° C. for 6 days, the weight decrease rate of the membrane was nearly 0% and the membrane resistance and the transference number were scarcely unchanged.

EXAMPLE XIX

A 100 micron-thick polytetrafluoroethylene film was prepared in the same manner as in Example XVIII. The graft rate, a hydroxylation rate and ion exchange capacity were 18%, 90% and 0.80 meq/g. dry resin respectively.

This cation exchange membrane had an electric resistance of 7.6 ohm.cm$^2$ when measured under 1 KHz AC in 0.6N KCl at 20° C., and a transference number of 0.98 when measured in 0.5N KCl/1.0N KCl after the conversion of phenolic hydroxyl group to K-form by the treatment of 0.5N-KOH aqueous solution. When the anion exchange membrane was dipped in distilled water at 95° C. for 6 days, the weight decrease rate of the membrane was nearly 0% and the membrane resistance and the transference number were scarcely unchanged.

EXAMPLE XX

Oxalyl chloride 0.6 g (5 m mols) was added dropwise to a mixture of alminum chloride 0.7 g (5 m mols) and carbon disulfide 10 ml maintaining the mixture temperature between 10°–15° C. by ice-cooling. The graft-polymer membrane piece (8 cm×6.5 cm) prepared in the same manner as in Example XVI was dipped in the above mixture solution for 10 minutes, and then was heated for 1 hour under reflux. After heating, the membrane was taken out of the solution, was dipped in 50 ml of 12N-HCl solution, and then washed with distilled water. The carboxylation rate of the thus obtained weakly acidic cation exchange membrane was 70%, and the ion exchange capacity was 0.70 meq/g. dry resin. This weakly acidic cation exchange had an electric resistance of 5.2 ohm.cm$^2$ when measured under 1 KHz AC in 0.6N-KCl at 20° C., and a transference number of 0.95 when measured in 0.5N-KCl/1.0N-KCl.

EXAMPLE XXI

The graft-polymer membrane prepared in the same manner as in Example XVI was dipped in chloromethylether containing alminum chloride as catalyst to be reacted at 58° C. for 6 hours, was washed with 10%-HCl, and then was washed with distilled water. A chloromethylation rate of the thus obtained graft-polymer membrane was 80%.

The graft-polymer membrane piece (8 cm×6.5 cm) after the chloromethylation, was heated together with 10 ml of diethyl phosphite at 100°–120° C. for 24 hours to be reacted. Upon completion of the reaction, the membrane was dipped in 50 ml of a 1N-HCl solution to be heated for 1 hour and then was washed with distilled water. A phosphonation rate of the thus obtained weakly acidic cation exchange membrane was 90% and the ion exchange capacity was 0.71 meq/g dry resin. The weakly acidic cation exchange membrane had an electric resistance of 5.1 ohm.cm$^2$ when measured under 1 KHz AC in a 0.6N-KCl aqueous solution, and a transference number of 0.95 when measured in 0.5N-KCl/1.0N-KCl after the conversion of phosphorous acid group to K-form by the treatment of 0.5N-KOH aqueous solution.

While the present invention has been set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A method for the preparation of a graft polymer membrane comprising an inactive polymer film selected from the group consisting of polyethylene film, polytetrafluoroethylene film, polychoroethylene film, polyvinylidene fluoride film, polyvinyl fluoride film, tetrafluoroethylene-hexafluoropropylene copolymer film, tetrafluoroethyleneethylene copolymer film, tetrafluoroethylene propylene copolymer film, tetrafluoroethylene-perfluoroalkyl vinyl ether copolymer film, chlorotrifluoroethylene-ethylene copolymer film, and chlorotrifluoroethylene-propylene copolymer film having α,B,B-trifluorostyrene as a graft chain; comprising the steps of:

irradating the inactive polymer film alone with ionizing radiation at a dose of 1–30 Mrad to produce radicals; and graft-polymerizing the resulting irradiated film by contacting said film with α,B,B-trifluorostyrene at a temperature within the range of 10°–90° C. for a time of 1–50 hrs., said graft polymerization being carried out while said radicals retain their life and, in the case of holding the films, by a time not greater than about two weeks from irradiation depending on holding temperature.

2. A method in accordance with claim 1, including the further step of sulfonating the obtained graft polymer membrane to provide a cation exchange membrane.

3. A method in accordance with claim 1, including the further steps of haloalkylating the obtained graft polymer membrane, and quarternary aminating the haloalkylated membrane to provide an anion exchange membrane.

4. A method in accordance with claim 1, including the further step of preparing a weakly acidic cation exchange membrane by substituting at least part of the benzene rings of said graft polymer by one of the groups among hydroxyl groups, carboxylic acid groups, phosphoric acid groups and phosphorous acid groups.

5. A method in accordance with any of claim 1 and 2 wherein said $\alpha,\beta,\beta$-trifluorostyrene is contacted with said film while in a solvent selected group consisting of chloroform, methylene chloride, carbon tetrachloride, 1,1,2,2-tetrachloroethane, 1,1,2-trichlorotrifluoroethane, and benzene.

6. A method in accordance with any of claim 1 and 2, wherein the graft polymerization is carried out without using any solvent for said $\alpha,\beta,\beta$-trifluorostyrene.

7. A method as set forth in claim 3 wherein the haloalkylating chloromethylating agent is chloromethylether.

8. A method as set forth in claims 3 or 7, wherein the quarternary aminating agent is trimethylamine.

9. A method as set forth in claim 4 wherein the substituting group is hydroxyl group and the hydroxylating reagent is hydrogen peroxide.

10. A method as set forth in claim 4 wherein the substituting group is hydroxyl group and the hydroxylating reagent is alkylhydroperoxide.

11. A method as set forth in claim 4 wherein the substituting group is carboxylic acid group and the carboxylating reagent is oxalic chloride.

12. A method as set forth in claim 4 wherein the substituting group is carboxylic acid group and the carboxylating reagent is butyl lithium and carbon dioxide.

13. A method as set forth in claim 4 wherein the substituting group is phosphorus acid group, and after chloromethylation of the benzene rings the phosphonation is carried out.

* * * * *